United States Patent [19]
Anderson et al.

[11] 3,747,169
[45] July 24, 1973

[54] SPRING FASTENER

[76] Inventors: Lloyd E. Anderson, 3123 Upton Ave., N., Minneapolis, Minn. 55412; Gilbert L. Alinder, 5312 Shoreview Ave., S., Minneapolis, Minn. 55417

[22] Filed: Sept. 3, 1971

[21] Appl. No.: 177,623

[52] U.S. Cl.............. 24/237, 24/73 C, 24/161 R, 24/259 FC, 24/261 C, 224/7
[51] Int. Cl............................................ A44b 21/00
[58] Field of Search.................. 24/236, 237, 261 C, 24/259 FC, 28, 161 R, 161 A, 159, 73 C, 158 S; 224/7

[56] References Cited
UNITED STATES PATENTS

| | | | |
|---|---|---|---|
| 2,574,755 | 11/1951 | Petrie | 24/73 C |
| 472,962 | 4/1892 | Collins | 24/237 |
| 3,263,879 | 8/1966 | Sanderson | 24/237 |
| 1,373,493 | 4/1921 | Dye | 24/259 FC |

*Primary Examiner*—Bernard A. Gelak
*Assistant Examiner*—Kenneth J. Dorner
*Attorney*—Schroeder, Siegfried, Ryan & Vidas

[57] ABSTRACT

A spring fastener formed of a wire fashioned into a spring loop is provided which insures a positive lock action for connection of the fastener to an eyelet or a loop in a cord. The spring fastener has a two-hole eyelet construction on one arm thereof, with the second arm passing through and being guided by one of the eyes and then bending back upon itself to allow the free end to pass through the second eyelet when in the closed position.

4 Claims, 4 Drawing Figures

PATENTED JUL 24 1973

3,747,169

INVENTORS
LLOYD E. ANDERSON
GILBERT L. ALINDER
BY
Schroeder, Siegfried, Ryan & Vidas
ATTORNEYS

SPRING FASTENER

Our invention is directed to a spring fastener which is specifically adapted for use under conditions where a positive latching arrangement is required. It is more particularly directed to a spring fastener usable under encumered conditions such as where one must work with gloves or where the users' hands are adversely affected by the cold. While the invention is anticipated to find a number of different usages, it is specifically directed to a spring fastener for use in attaching duck decoys along a length of rope or cord. Through the construction of the spring fastener of our invention, a positive guiding and locking action is provided which insures that the user of the fastener can handle it even when encumbered with heavy gloves and yet be certain that the spring, once fastened, will not become disengaged in its normal usage.

In accomplishing these purposes, the spring is fashioned of a single length of spring steel wire formed into a spring loop with two arms extending upwardly and in the same plane. One of the arms is provided with a double eyelet construction at the free end thereof, with the openings of the eyelets on an axis toward the other arm. The second arm is passed through one of the eyelets and is then bent back upon itself so that the free end can pass into the second eyelet when the spring fastener is in the closed position and which, when in the open position, allows the free end to pass about an eyelet or loop when it is desired to engage the spring fastener to such a loop.

IN THE DRAWINGS

Figure 1:
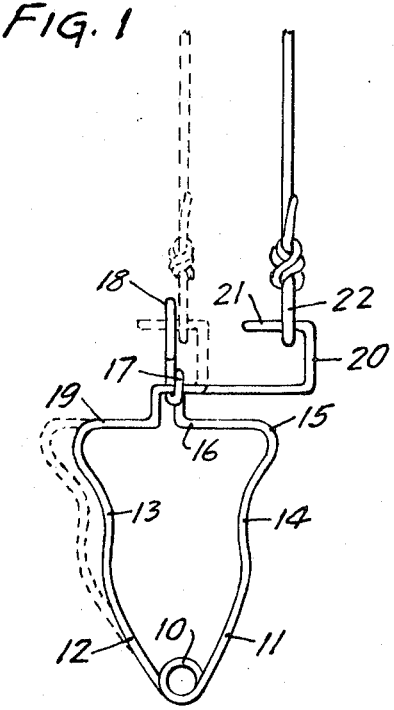
FIG. 1 is a front elevational view of a spring fastener in accordance with the invention wherein a single length of wire forms the entire unit.
Figure 2:
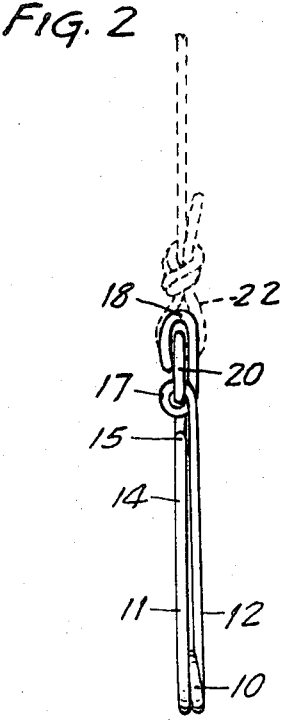
FIG. 2 is a side elevational view of the spring fastener of FIG. 1.

Turning now to the figures, there is illustrated in FIG. 1 a spring fastener in accordance with the invention wherein a single length of wire has been shaped to form a spring fastener. The fastener, for the sake of clarity, is shown in the compressed or open state, with the dotted line outline showing the fastener in its relaxed or closed position. The single length of wire has been bent to form a spring loop 10 with two arms 11 and 12 extending upwardly therefrom and in generally the same plane. Both arms 11 and 12 have been provided with a curved portion 13 and 14 to aid in the handling of the spring fastener during use.

Arm 11 has been bent at 15 and then again at 16 to provide an upwardly projecting portion. The portion projecting upwardly along the center axis of the fastener has been shaped to form a first loop 17, with the free end of the wire extending upwardly from loop 17 and being curved back upon itself to form a second loop 18. The openings in loops 17 and 18 provide first and second eyelets for the purpose which will be described.

Arm 12 has been bent at 19 and has had its free end pass through the opening of loop 17 and therebeyond. After passing through eyelet 17, the free end of arm 12 has been bent at 20 about a 180° curve to leave a short free end 21. End 21 is on a line to pass through the opening of loop 18.

As is illustrated in FIG. 1, loop 17 provides a guide for arm 12 to keep the end portion 20 and 21 in alignment with upper loop 18. When the spring has been allowed to close in accordance with the dotted line portion of FIG. 1, a loop of material such as cord 22 is engaged by the arm portion 21 of free end 20 and becomes locked firmly in place. When the fastener spring is in the compressed position (solid lines), end 21 is available for ready insertion into a loop or eyelet such as shown in cord 22.

As can be seen, the unit of FIG. 1 is of simple construction and utilizes a single piece of wire to form the entire spring fastener of the invention. When the fastener is to engage a loop, the arm portions 11 and 12 are bent resiliently toward one another to provide the opening for insertion of a loop or eyelet around arm 21. Upon release of the pressure on arms 11 and 12, the assembly closes securely, locking the eyelet. Of course, one may fasten the opposite end of the eyelet, such as in its spring loop 10, to another anchor point as desired.

Figure 3:
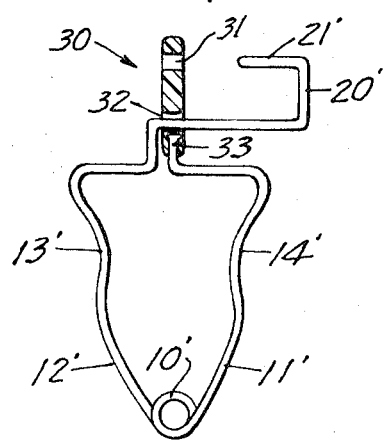
FIG. 3 is a front elevational view of a second form of the invention wherein the eyelet members are formed of a separate material joined to one arm of the main wire.
Figure 4:
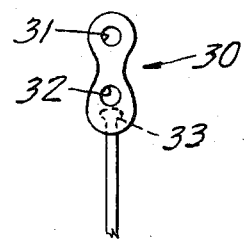
FIG. 4 is a side elevational view of the double eyelet portion of FIG. 3.

Turning to FIG. 3, there is illustrated a modified form of our invention wherein equivalent portions to those of FIG. 1 are given the same numerical designation with a prime superscript. The spring fastener is shown in compressed and open position. As in FIG. 1, the end 21' will, in the relaxed and closed position, pass into opening 31. In the construction of a spring fastener in accordance with FIG. 3, a separate double eyelet portion generally identified 30 is illustrated in cross section. A side elevational view of element 30 is shown in FIG. 4. This double eyelet portion 30 may be formed of plastic or of metal and is connected by suitable means to the upper tip of arm 11'. Eyelet portion 30 be formed about the end of arm 11 in a molding operation, or it may be bonded thereto using adhesive or the like. In the figure, eyelet portion 30 has a cavity 33 into which the tip of arm 11 extends. When formed of metal, it may be either crimped to the end of wire 11', or it may be welded thereto. Eyelet 30 consists of a unitary body of material which has been formed so as to have two openings 31 and 32 passing therethrough. The upper portion of arm 12' has been passed through opening 32 and then bent back upon itself at 20' to form a free end 21' positioned to pass into and out of opening 31 in response to pressing and releasing of arm 11' and 12'. The engaging action is, as can be seen, essentially identical to that of the construction of FIG. 1.

We claim:

1. A spring fastener comprising first and second spaced wire arm members having a common plane, said arm members resiliently biased so that the upper portions thereof tend to be forced apart, the first of said arms having at the upper end thereof an eyelet portion defining two openings extending therethrough, the diameters of said openings corresponding to the diameter of said wire, with the axis of said openings being in said plane and parallel to one another and oriented toward the upper end of said second arm, said second arm having the upper portion thereof curved toward said eyelet portion and having a first substantial length thereof on the axis of and passing through one of said openings with the remote end of said arm extending beyond said opening being curved generally back upon itself to form a second length thereof on the axis of said second opening, said second length being shorter than said first length so as to permit passage of the free end thereof out of and into the other of said openings in response to compression and relaxation pressure on said arms.

2. A fastener in accordance with claim 1 wherein a unitary length of wire has been shaped to form a spring loop with said first and second arm members being defined by the opposite ends of said wire.

3. A fastener in accordance with claim 1 wherein said eyelet portion is a separate member joined to the end of said first arm.

4. A fastener in accordance with claim 1 wherein the eyelet portion is defined by the upper end of said first arm formed into first and second loops adjacent one another and in the same plane.

* * * * *